United States Patent [19]

Cooper et al.

[11] Patent Number: 5,559,658

[45] Date of Patent: Sep. 24, 1996

[54] SOLID-STATE HIGH VOLTAGE CROWBAR CIRCUIT

[75] Inventors: James L. Cooper, Everett; Mark Adams, Arlington, both of Wash.

[73] Assignee: ELDEC Corporation, Lynnwood, Wash.

[21] Appl. No.: 301,229

[22] Filed: Sep. 6, 1994

[51] Int. Cl.$^6$ .................................................... H02H 9/00
[52] U.S. Cl. ................ 361/56; 361/91; 361/111; 361/118
[58] Field of Search ................................. 361/56, 54, 91, 361/93, 111, 118; 323/270

[56] References Cited

U.S. PATENT DOCUMENTS

| | | | |
|---|---|---|---|
| 3,539,865 | 11/1970 | Billings | 317/16 |
| 3,569,784 | 3/1971 | Carroll | 317/16 |
| 3,579,036 | 5/1971 | McCoy | 317/16 |
| 4,054,933 | 10/1977 | Praeg | 361/57 |
| 4,232,351 | 11/1980 | Baker | 361/56 |
| 4,893,070 | 1/1990 | Milberger | 323/270 |
| 5,196,980 | 3/1993 | Carson | 361/18 |

OTHER PUBLICATIONS

Cuthbert, D., Circle 522 HV Crowbar Switches 2.4 MW, *Electronic Design*, 144 (1991).

*Primary Examiner*—Jeffrey A. Gaffin
*Assistant Examiner*—Stephen W. Jackson
*Attorney, Agent, or Firm*—Christensen O'Connor Johnson & Kindness

[57] ABSTRACT

Cascaded transistor stages are connected between a high voltage and a resistance coupled to a lower potential. The transistor stage closest to the lower potential is referred to as a driver stage, and all the other transistor stages are referred to as component stages. When an enable signal is provided to the driver stage, the stages sequentially enter conduction, starting with the driver stage and proceeding to the component stage coupled to the high voltage. The current flow through the driver stage is regulated, proportional to the value of the series resistance, and remains relatively constant as the high voltage is brought to close to the lower potential. The voltage drop is smooth and approximately linear, ensuring that voltage ringing or rebound does not occur following the discharge. After the high voltage is brought to the lower potential, the transistor stages remain in conduction as determined by the presence of the enable signal, to discharge any remaining high voltage that may be attached through a high series impedance. Upon removal of the enable signal, the transistor stages no longer conduct.

26 Claims, 3 Drawing Sheets

SOLID-STATE HIGH VOLTAGE CROWBAR CIRCUIT

FIELD OF THE INVENTION

The invention relates generally to crowbar circuits, and more particularly to a solid-state crowbar circuit for shunting a large current at high voltage to a safe potential.

BACKGROUND OF THE INVENTION

In applications using a high voltage power supply, it is often desired to rapidly discharge the high voltage to a safe potential within a short period of time. Circuits designed to accomplish this are known as crowbar circuits or energy diverters. They are designed to quickly reduce a high potential to a low potential in order to prevent damage to equipment connected to the power supply, and also for the safety of those who may come in contact with exposed high voltage components.

An example of an application where crowbar circuits are desirable is with a helmet-mounted avionics display for military pilots. Helmet-mounted displays can require up to 20,000 volts to drive a cathode ray tube (CRT) in the display. Prior to disconnection of the helmet, such as during an emergency ejection, it is desirable to rapidly discharge the energy from the cockpit power supply in order to minimize the risk that an arc or spark might be created in a potentially explosive environment. Not only must the potential be discharged, but it also must be discharged as rapidly as possible.

Different approaches have been used to construct crowbar circuits. As shown in FIG. 1, one prior art type of crowbar circuit uses a spark gap 28 to quickly discharge a high voltage source potential. A high voltage source 20 is connected to a cathode ray tube (CRT) display 26 via electrical connectors 22 and 24. Connectors 22 and 24 allow the display to be disconnected from the power supply. As noted above, before disconnecting display 26 from high voltage source 20 it is desirable to discharge the high voltage source potential to a lower potential, preferably near ground, in order to eliminate the risk that sparks or an arc will be generated when electrical connectors 22 and 24 are uncoupled.

When high voltage source 20 is to be discharged, i.e., when it is desired to uncouple the CRT, a trigger circuit 30 is used to apply a trigger pulse to the spark gap which can be a small canister filled with a normally nonconducting radioactive gas. The trigger pulse produces a small arc within the spark gap, which begins to ionize the gas within the device. As the gas is ionized, the spark gap 28 becomes conductive, and current begins to flow from the high voltage source through the spark gap to ground. An avalanche effect is started, and the ionization increases with the increased current flow. This causes the high voltage potential to decay rapidly, as the initial charge is quickly channeled to ground. Once the current falls to a value insufficient to maintain arc conditions, current flow ceases and the gap returns to the nonconductive state.

While the spark gap crowbar circuit shown in FIG. 1 quickly discharges a high voltage source, it has several shortcomings. Physically, spark gap 28 is a fairly complex component containing a trace mount of radioactive tritium gas, for example. Because the rapid ionization of the gas quickly wears out the device, the spark gap must be periodically replaced at substantial cost. The spark gap also must be correctly sized for each application. Since a spark gap only operates within a narrow range of voltages, different spark gaps must be used in different environments. The operation of a spark gap is further limited in that a spark gap will not discharge a voltage that is less than 40% of its rating. As a result, designing with spark gaps is not an easy process.

Another disadvantage to using the spark gap circuit shown in FIG. 1 is that the quick discharge performed by the circuit produces voltage tinging. FIG. 3 is a graph depicting a typical spark gap's voltage ringing. The left vertical axis represents the voltage, and the lower horizontal axis represents time. A plot of the output potential across the spark gap is represented by a line 60. At time $T_1$, the spark gap is triggered to discharge the high potential voltage. As shown by the near vertical slope of line 60 between times $T_1$ and $T_2$, the voltage quickly drops to near a ground potential. A typical spark gap crowbar circuit will be able to discharge a 13,000 volt potential in less than 15 nanoseconds. A result of this rapid discharge, however, is a voltage ringing induced between times $T_2$ and $T_3$. That is, the voltage across the spark gap partially rebounds before decaying down to a steady ground potential. In a typical spark gap device, the voltage rebound can be significant. The initial value of the ringing voltage may reach a level of 400 volts, a value that can cause component damage due to electrostatic discharge. In addition, the existence of a potential of even a few hundred volts can potentially harm user if sparks or other arcs are created by the crowbar circuit.

Another crowbar circuit design is a transformer-driven transistor array of the type shown diagrammatically in FIG. 2, which operates in the same environment as the circuits of FIG. 1. That is, high voltage source 20 is connected to display 26 via connectors 22 and 24. Instead of using a spark gap device, however, the crowbar circuit of FIG. 2 relies upon a number of transistor stages 40. A high voltage is applied across a number of these transistor stages, which are connected in a cascade configuration. In normal operation, the transistors are biased off so that no current will flow through the transistor stages 40. Each transistor stage 40 is coupled via a shared transformer 42 to a drive circuit 44. When a high voltage is to be discharged, the drive circuit is turned on, biasing each of the transistor stages 40 into saturation. When in saturation, each transistor stage 40 conducts current between the high voltage source and ground. Because all transistor stages are turned on simultaneously, the result is a rapid decay of a high voltage potential down to a ground potential. Typical transformer-driven transistor array circuits can discharge a 13,000 volt potential in under five microseconds. Once the drive circuit is turned off, the transistor bias potential is allowed to leak away, returning the transistors to nonconductive operation.

A disadvantage of a crowbar circuit constructed with a transformer-driven transistor array is that the transformer needed to simultaneously turn on all of the transistor stages 40 is a large and expensive device (the transformer must withstand the total output voltage). Additionally, because the circuit can discharge a high potential within less than five microseconds, the circuit also exhibits a voltage tinging as shown in FIG. 3. That is, much like a spark gap crowbar circuit, the rapid discharge of the high voltage source results in a voltage rebound of several hundred volts which could potentially impose a danger both to the circuit and to people nearby.

SUMMARY OF THE INVENTION

The present invention provides a solid-state crowbar circuit for shunting a large current at high voltage to a safe potential. The circuit consists of multiple transistor stages connected in cascade, one end of the circuit being connected to a high voltage source, and the other end of the circuit being coupled to ground through a discharge resistance. In the preferred embodiment a diode is connected in parallel with the transistor of each stage. Thus, there is a continuous series of discrete current blocking diodes between the high voltage source and ground. In addition, each stage has a resistor connected between the gate and source of its transistor. The gate-to-source voltage, i.e., current through the resistor, determines whether or not the transistor of that stage is "on" or "off."

The transistor stage immediately connected to the discharge resistance is referred to herein as the driver stage. The driver stage has an enable input allowing the driver transistor to be biased on. Normally, however, the driver stage is biased off so that the stage is nonconducting.

The transistor stages connected between the high voltage source and the driver stage are referred to herein as the component stages. Each of these stages is similarly normally biased in an off state so that the stage is nonconducting. When the crowbar circuit has not been enabled, the impedance seen by the high voltage supply is equal to the sum of the transistor off resistances. In practice, the off impedance of each transistor stage exceeds one giga ohm. Therefore no current typically flows through the crowbar circuit when it is disabled.

When it is desired to discharge a high voltage source, an enable signal is generated to bias the driver stage of the crowbar circuit on. In the on state, the driver stage provides a current path through the gate-to-source resistor of the component stage adjacent to the driver stage, which then also begins to conduct to provide a current path through the gate-to-source resistor of the next component stage. This process continues with each component stage turning on after the stage below it turns on. Eventually, all component stages are turned on, creating a current path through the transistors of all stages from the high voltage source through the discharge resistance to ground.

As each component stage turns on, the impedance across it changes from an essentially open circuit to an essentially closed circuit. In the closed circuit on state, there is negligible voltage drop across it, such that the voltage of the source is applied across fewer and fewer of the series connected diodes. Eventually, the ratings of the diodes remote from the driver stage are exceeded and they operate in avalanche mode, providing a separate current path around the transistors of the upper component stages. Current therefore flows from the high voltage source, through the avalanching diodes, then through the conducting transistors and the discharge resistance to ground, as the upper component stages continue to turn on one-by-one. Meanwhile, the discharge resistance has the effect of maintaining an almost constant current from source to ground so that the source voltage is discharged essentially linearly, over a selected period long enough to prevent potentially harmful flyback or ringing.

The series connected diodes also act as a voltage clamp to limit the voltage that may be applied by the high voltage source to the load CRT. If a voltage is generated that exceeds the sum of all the avalanche voltages of the diodes, the diodes will enter avalanche conduction and discharge the excess potential. This over-voltage clamp protection ensures that voltages above a specified value will not be accidentally supplied to the load.

An advantage of the disclosed invention is that it provides a rapid linear discharge of high voltage without inducing flyback or ringing. Ringing is minimized by discharging the electrical current at a controlled rate. The controlled discharge rate not only reduces voltage ringing, it also places less stress upon the components in the crowbar circuit.

A further advantage of this circuit is that it uses solid-state components which are readily available and relatively inexpensive. Because solid-state components are used, the entire crowbar circuit can be constructed to displace a very small volume and be of minimal weight. It is also easier to tailor the crowbar circuit to the precise high voltage that is to be discharged by varying the number of component stages in the circuit. That is, the number of component stages may be varied depending upon the anticipated maximum voltage that must be shunted. This allows the crowbar circuit to be simply and easily adjusted to operate in different environment.

A still further advantage of this invention is that it provides over-voltage clamp protection for the high voltage power supply and associated external load. That is, if the voltage exceeds the sum of the avalanche values for each of the diodes, the diodes will enter a conductive state to discharge the excess voltage. This ensures that voltage over a set level will not be applied to the load.

It is also an advantage of this circuit that the enable signal used to drive the circuit is directly coupled to the driver stage. Unlike spark gap or transformer-driven transistor array crowbar circuits, there is no magnetic induction required to trigger the operation of this circuit. This reduces the possibility that stray electric or magnetic fields will unintentionally trigger the discharge of the high voltage source.

Finally, the disclosed circuit is also constructed to allow multiple high voltage levels to be simultaneously discharged, such as both the anode and focus voltages of a CRT which may differ by several thousand volts. This eliminates the use of more than one crowbar circuit in a given environment.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

Detailed Description of the Preferred Embodiment

Figure 4:
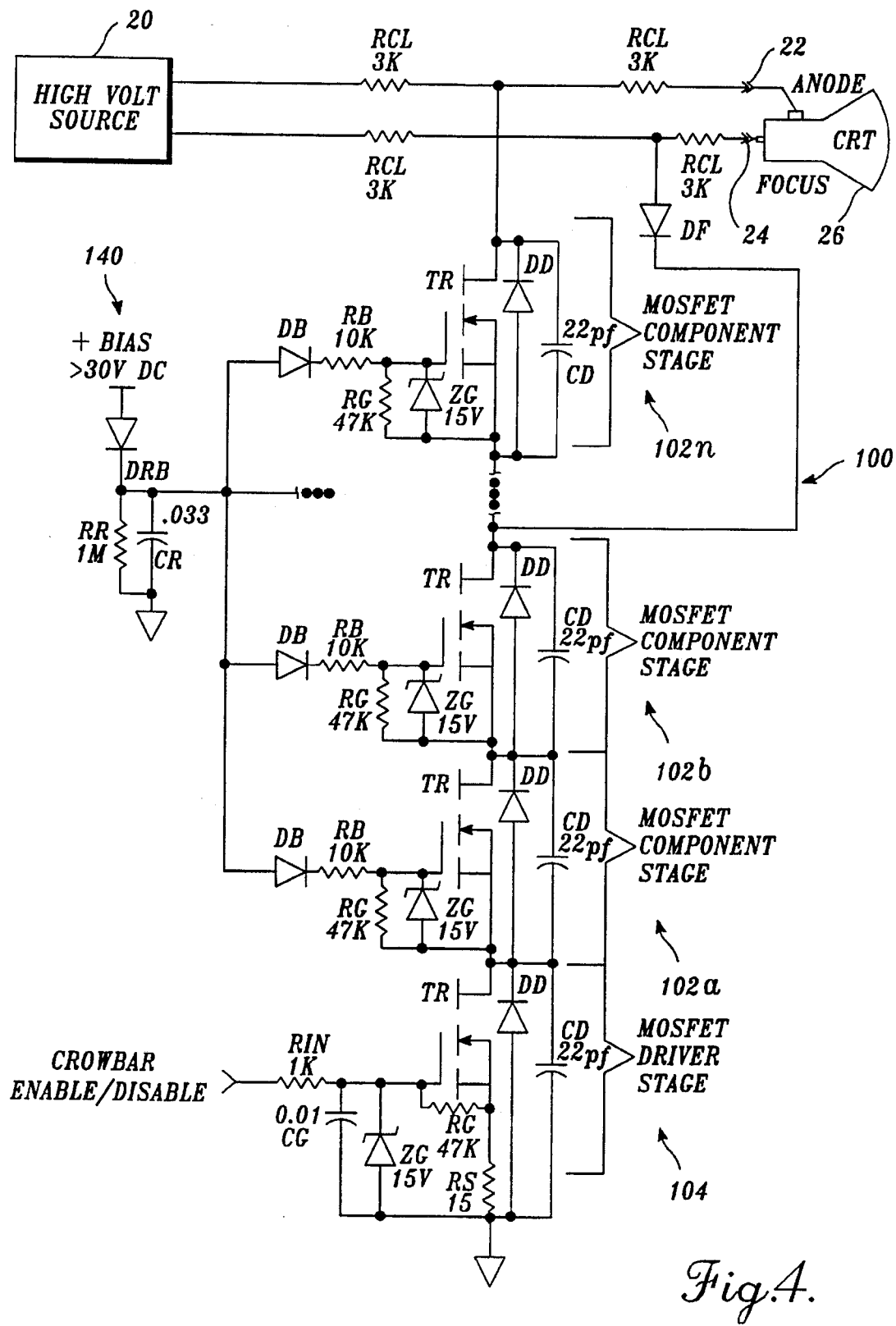
FIG. 4 is a schematic of the solid-state crowbar circuit of the present invention, whereby a driver stage with discharge resistance is used to regulate the current flow discharged through a series of component stages.

FIG. 4 shows a preferred embodiment of a solid-state crowbar circuit 100 in accordance with the present invention. The crowbar circuit 100 is shown operating in the same environment discussed above. That is, a high voltage source 20 is connected to a CRT display 26 via two connectors 22 and 24. The CRT display 26 may be separated from the high voltage source 20 by disconnecting the connectors. While the preferred embodiment of crowbar circuit 100 is shown operating in this environment, those skilled in the art will recognize that the crowbar circuit disclosed herein can be used in any application where it is desired to reduce a high voltage potential to near ground potential, or any other specified potential, in a short period of time.

Crowbar circuit 100 consists of a number of component stages 102a, 102b, 102n connected in cascade with a driver stage 104 that includes discharge resistor RS. The discharge resistor RS is connected to ground. As will be described in more detail below, the component stages 102a, 102b, . . . 102n and driver stage 104 are initially biased "off" such that no current flows from the high voltage source 20 through the component and driver stages to ground. When a high voltage is to be shunted, an enable signal is applied to the driver stage 104. The driver stage 104 becomes biased on and begins to provide a current path for the adjacent component stage 102a which then rams on and provides a current path for the adjacent stage 102b, which then turns on, and so on. Thus the component stages 102a, 102b, . . . 102n are biased on sequentially, beginning with the component stage closest to the driver stage, and ending with the component stage that is connected to the high voltage source.

Preferably, a diode DD is connected in parallel with each stage and, as the stages turn on sequentially such that there is little voltage drop across those stages, eventually the diodes more remote from the driver operate in avalanche to provide a current path from the source to ground. The sequential biasing of the component stages in conjunction with the discharge resistor RS results in a controlled linear drop of the high voltage potential to close to a ground potential within a short period of time. Because the potential drop is tightly controlled in comparison to the prior art crowbar circuits, there is reduced stress placed on the components of the circuit and no potentially harmful voltage ringing following the voltage drop.

Examining the preferred construction of the crowbar circuit 100 in more detail, it is first noted that each component stage 102a, 102b, . . . 102n is constructed with the same circuit elements. For purposes of this description, a generic component stage 102n will therefore be discussed as representative of all the component stages. Component stage 102n is constructed around a transistor TR, which in the preferred embodiment of the circuit is a MOSFET. Diode DD is connected across the drain and source of the transistor in parallel with a capacitor CD. A resistor RG is connected across the gate and source of the transistor in parallel with a zener diode ZG. Resistor RG and zener diode ZG are selected to prevent transistor conduction due to leakage current during biased-off operation, to generally protect the transistor from gate-to-source stress during biased-on operation, and to provide the desired gate-to-source voltage to turn the associated transistor on when a current path to ground is provided. In an actual embodiment of the crowbar circuit, circuit elements for each component stage are as follows:

| Component | Part Number or Rating |
|---|---|
| Diode DD | BYJ96D, BYD37M |
| Capacitor CD | 22 pF |
| | 1808N100J202N, VJ1808A220JXGA |
| Zener Diode ZG | 15 V rating |
| Resistor RG | 47 K ohms |
| MOSFET TR | IRFBG20, IRFR420, IRFRC20 |

All component stages 102a, 102b, . . . 102n are biased by a shared bias circuit 140. Bias circuit 140 consists of a diode DRB connected on one end to a positive voltage source (+BIAS) and on the other end to a resistor RR and a capacitor CR. Diode DRB is selected to ensure that reverse current will not flow into the positive voltage source (+BIAS). In a preferred embodiment of the crowbar circuit, the positive voltage source must provide a voltage greater than 30 volts VDC. The shared bias circuit is coupled to each component stage by a diode DB in series with a resistor RB. Diodes DB are selected to ensure that reverse current will not flow from the high voltage source 20 to the bias circuit 140. Resistors RB are sized to limit the current flow from the bias circuit 140 to the component stages 102a, 102b, . . . 102n. In an actual embodiment of the crowbar circuit, the circuit elements of bias circuit 140 and associated component stages are as follows:

| Component | Part Number or Rating |
|---|---|
| Diode DRB | IN5617 |
| Resistor RR | 1 M ohm |
| Capacitor CR | 0.033 uF |
| Diode DB | M160FG, ESJA92-12 |
| Resistor RB | 10 K ohm |

At the heart of the crowbar circuit 100 is the driver stage 104. Driver stage 104 is similar to component stages 102a, 102b, . . . 102n in that it is constructed around a transistor TR, preferably a MOSFET. Discharge impedance, preferably a resistor RS, is connected between the source of transistor TR and ground. The discharge resistor is selected to have a peak power capability sufficient to handle the energy shunted from high voltage source 20. Included in parallel with the driver transistor and discharge resistor combination is a diode DD and a capacitor CD. Diode DD and capacitor CD serve the same functions as they do in the component stages, that is, they are selected to provide over-voltage protection for the circuit.

Also included in the dryer stage 104 are several components necessary to bias the driver transistor on so that it will conduct current. Zener diode ZG, connected between the gate of the transistor and ground, is sized to limit the voltage applied to the MOSFET gate. Resistor KG, connected across the transistor gate and source is selected to provide sufficient gate-to-source voltage to turn the driver transistor on when an enable signal is received. Finally, a resistor RIN and capacitor CG network is connected between an enable input and the gate of the driver transistor. The network is designed to hold constant and filter out noise disturbance from the gate-to-source connection of the driver transistor. In an actual embodiment of the crowbar circuit, the driver circuit components are as follows:

| Component | Part Number or Rating |
|---|---|
| Transistor TR | IRFBG20, IRFR420, IRFRC20 |
| Diode DD | BYJ96D, BYD37M |
| Capacitor CD | 22 pF |
| | 1808N100J202N, VJ1808A220JXGA |
| Capacitor CG | 0.01 uF |
| Zener diode ZG | 15 V |
| Resistor RG | 47 K ohm |
| Resistor RIN | 1 K ohm |

Turning now to the operation of the crowbar circuit 100, in one mode of operation, the crowbar circuit operates as a high voltage clamp to limit the voltage that may be applied by high voltage source 20 to a load. In this mode of operation, diodes DD operate in avalanche when a voltage exceeding a maximum desired voltage is generated by high voltage source 20. Diodes rated at 1,000 volts will typically avalanche at 1,100 to 1,200 volts. If, for example, the crowbar circuit consisted of twelve component stages plus one driver stage, the series connection of diodes DD would avalanche when the applied voltage exceeds between 13,000 and 15,600 volts (13 stages * 1,000 to 1,200 volts/stage). When in avalanche, the voltage across the crowbar circuit 100 is limited to the sum total of the individual diode avalanches. This protects CRT display 26 or other load from breakdowns in the high voltage source or application of an external potential. To ensure that the diodes will enter avalanche operation before the cascaded combination of transistors TR, the transistor avalanche rating is selected to be higher than that of the diodes. For example, the transistors may be selected to have an operating limit of between 1,200 and 1,500 volts. The diodes will therefore always enter avalanche before the transistors.

In a second mode of operation, crowbar circuit 100 is used to rapidly and substantially linearly reduce a high voltage potential to close to ground. The number of component stages used in the crowbar circuit directly determines the voltage level that may be shunted. Each component stage contributes to discharging a voltage potential equal to the maximum avalanche voltage of that stage. In the preferred embodiment as described above, diodes DD are selected to avalanche before transistors TR. Therefore, the diode rating of each component stage 102a, 102b, . . . 102n is used to determine the number of component stages necessary to discharge a particular voltage. For example, if the operating voltage of the high voltage source were 13,000 volts and if diodes rated at 1,000 volts are used in the crowbar circuit, a total of twelve component stages would be required in the crowbar circuit. The total operating voltage of the twelve diodes in the component stages and the single diode in the driver stage would add to a number approximating the required operating voltage of 13,000 volts. The use of thirteen transistor stages with 1,000 volt diodes in the crowbar circuit will hereinafter be referred to as a representative embodiment of the circuit.

Before an enable signal is received to discharge a high voltage, component stages 102a, 102b, . . . 102n are biased-off so that the transistors are nonconducting. This allows component stages 102a, 102b, . . . 102n to "float." The bias circuit 140 provides sufficient potential to the gates of component stage transistors TR so that they will become biased on when the gate-to-source turn-on voltage is exceeded by current flow through the associated resistor RG. Similarly, driver stage 104 is biased off, ensuring that no current flows through discharge resistor RS. With all stages of the crowbar circuit biased off, the impedance of crowbar circuit 100 as measured from high voltage source 20 to ground is very high. With the off impedance of each stage exceeding one gigaohm, the crowbar circuit acts essentially as an open circuit. In the biased off operation, the high-voltage source therefore directly supplies power to CRT display 26.

When it is desired to shunt the high voltage potential to ground, an enable signal is applied to driver stage 104. In the representative embodiment of the circuit, a 15 V signal is applied to resistor KIN of the driver stage. The positive voltage signal is applied across resistors RIN, RG and RS, and the voltage developed across resistor P-G is in excess of the driver transistor's gate-to-source threshold potential. The driver transistor is therefore biased on.

After the driver transistor is biased on, a current path is provided from the component stage bias circuit 140, through diode DB, resistor RB and resistor RG of the adjacent component stage 102a, and through the driver transistor and discharge resistance to ground. When the voltage across RG rises sufficiently above the gate- to-source potential threshold of component transistor TR, component stage 102a is biased on. This process repeats for each component stage. The transistor TR of each component stage remains biased off, and nonconducting, while the component stages located nearest the driver stage sequentially enter conduction. That is, component stage 102a enters conduction, followed by component stage 102b, and proceeding until component stage 102n is conducting.

As the component stages become biased on and conducting, the high voltage initially applied across all of the component and driver stages is essentially applied across fewer and fewer component stages whose transistors are still biased off. Eventually, the per stage voltage is sufficiently great to force the diodes of the off-biased stages into avalanche, allowing current to flow from the high voltage potential through the avalanching diodes to the first component stage 102a, 102b, . . . 102n that is conducting. The current then flows through the remaining biased-on transistors of each component stage, driver transistor TR, discharge resistor RS, and finally to ground. The component stages continue to turn on sequentially. The result is that over a very short period, but nevertheless not instantaneously, current flows from the high voltage potential through the discharge resistor to ground. The rate of current discharge is controlled by the discharge resistor RS acting in conjunction with the dryer stage.

Eventually, transistors 120a, 120b, . . . 120n of all the component sections have been turned on and the potential is discharged down to a very low value. In the representative embodiment of the disclosed invention, a 13,000 volt DC output potential was discharged to 30 volts DC in around 100 microseconds. This was achieved with a 400 milliamp discharge current that was maintained relatively constant throughout the discharge period. Since the voltage discharge is performed in a controlled (and almost linear) manner, them is minimal output voltage ringing.

Figure 1:
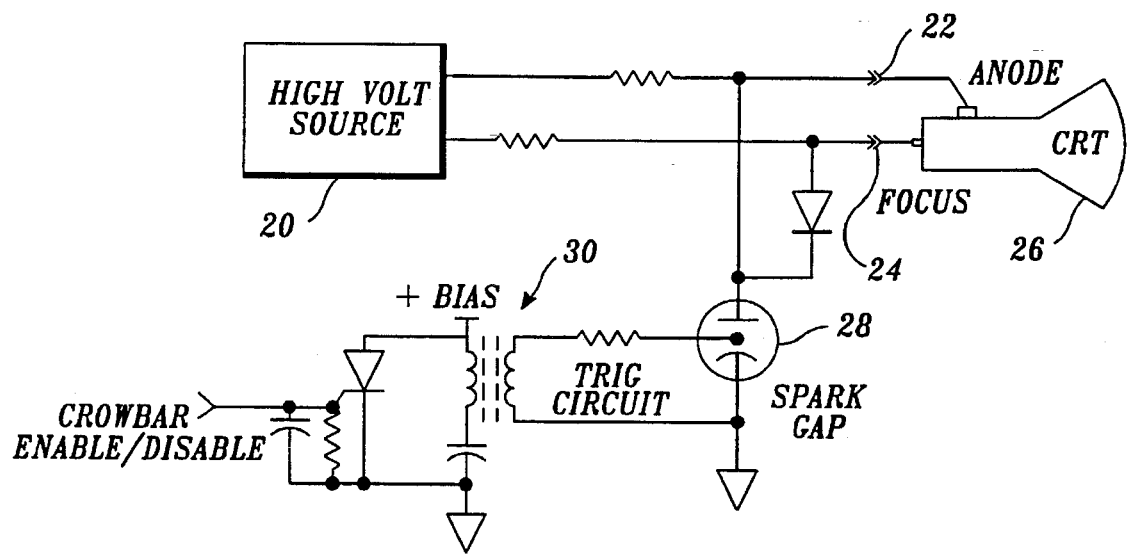
FIG. 1 is a schematic of a prior art crowbar circuit that relies upon a spark gap to discharge a high voltage.
Figure 2:
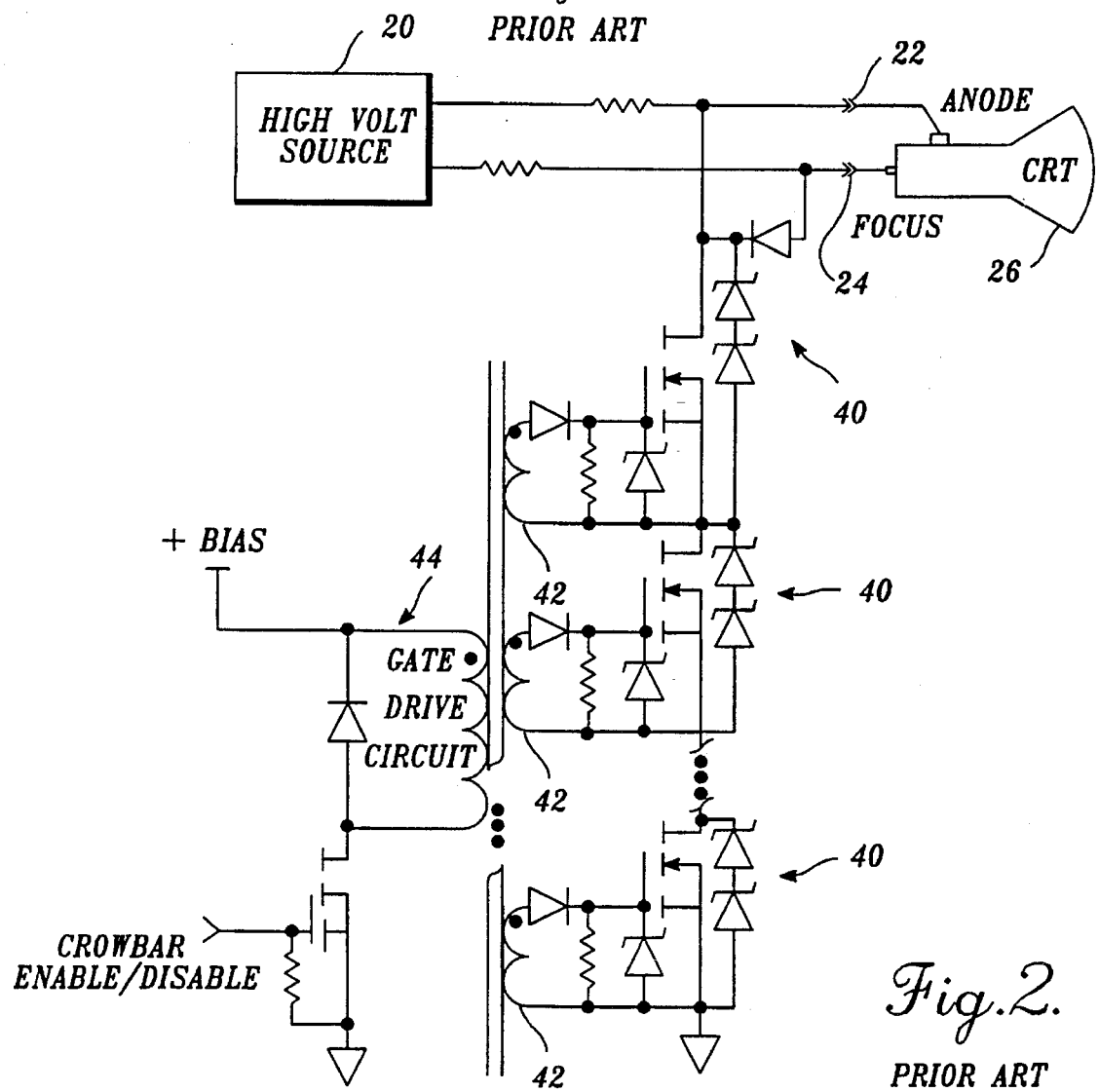
FIG. 2 is a schematic of a prior an crowbar circuit using a transformer-driven transistor array.
Figure 5:
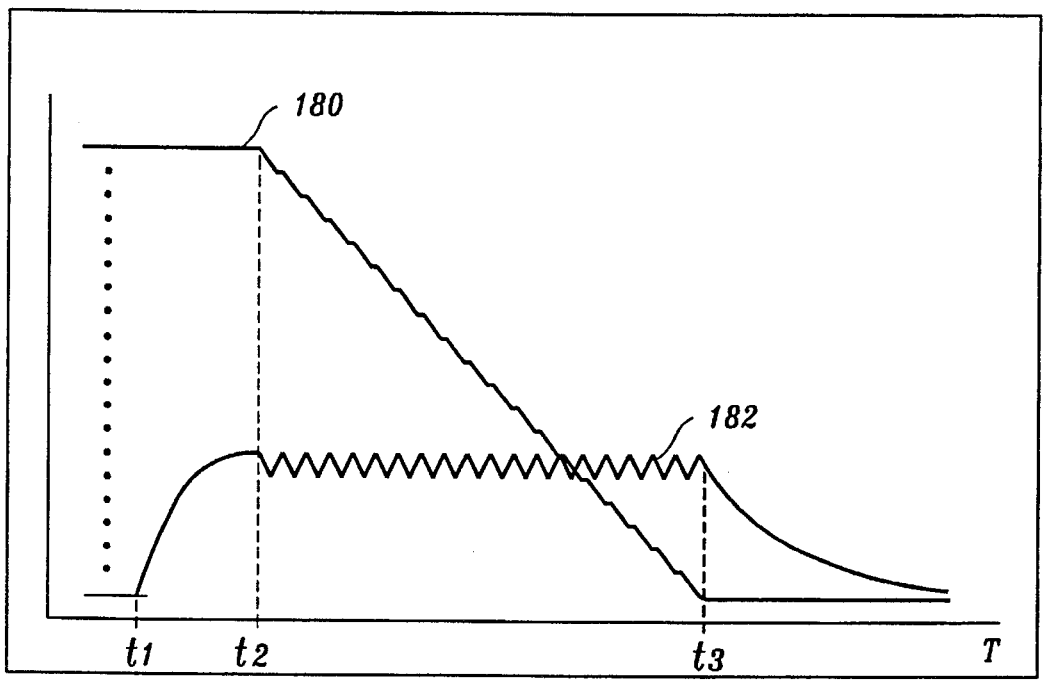
FIG. 5 is a graph of the drop in voltage and current versus time generated by a representative embodiment of the invention.
Figure 3:
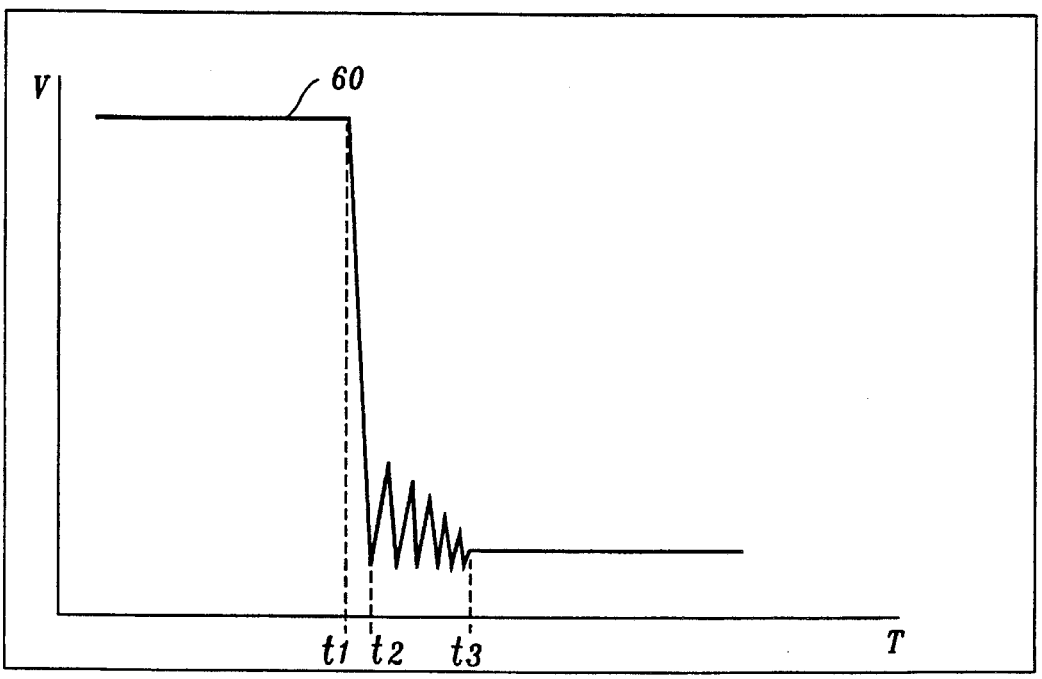
FIG. 3 is a representative graph of the drop in voltage over time generated by the prior art crowbar circuits of FIGS. 1 and 2.

FIG. 5 is a representative graph of the voltage and current levels in an actual embodiment of the crowbar circuit 100. Line 180 represents the voltage measured across the crowbar circuit, from the high voltage source to ground. Line 182 represents the current flow through the driver stage 104. Although not to scale, the graph provides an approximation of the operating characteristics of the circuit. As shown in FIG. 5, at a time $T_1$ an enable signal is generated to bias the driver stage 104 on. The current in the driver stage begins to rise. At time T2, a sufficient number of the component stages have been turned on that the diodes DD of the other stages avalanche. As each subsequent component stage enters conduction, the voltage across the crowbar circuit linearly drops as indicated by the downward slope of line 180. At the same time, the current through the driver stage 104 remains approximately constant, as evidenced by the zero slope of line 182. At a time $T_3$, the high voltage has been discharged to a suitably low potential (close to ground). At this time, the current through the driver stage 104 decays to zero. It will be appreciated by those skilled in the art that the overall discharge time, rate, and current limit may be adjusted by appropriate selection of circuit components.

In a third mode of operation, multiple voltage levels of varying amplitude may also be discharged in the same shunting operation. As shown in FIG. 4, a feedback diode DF is included to connect the focus of CRT display 26 with crowbar circuit 100 at a point distinct from the point connected to high voltage source 20. A focus of a CRT display typically operates at a voltage level several thousand volts below that of an anode of a CRT display. For example, in the representative embodiment of the crowbar circuit, the focus of display 26 is maintained at 3,000 VDC. Discharging this voltage only requires two component stages to be connected to the driver stage. As shown in FIG. 4, it is therefore possible to directly couple the reduced focus voltage to a point immediately following component stage 102b. When discharging a higher anode voltage, a lower focus voltage is thereby discharged as the component stages begins to turn on. This eliminates the need for multiple crowbar circuits in the same environment. Diode DF is a high voltage diode provided to isolate the anode potential from the focus potential. In an actual embodiment of the crowbar circuit, an X100FG diode is used. The crowbar circuit also limits the maximum voltage that can be applied at the focus terminal by the clamping action of the diode DD between the focus terminal and ground.

From the above description, it will be appreciated that an advantage of the crowbar circuit 100 is that a voltage discharge is handled in a controlled manner to prevent ringing in the voltage output. This eliminates the safety concerns associated with voltages that would rebound to several hundred volts. It will also be recognized that, unlike prior art crowbar circuits, the crowbar circuit of the present invention relies upon all solid-state devices in its construction. The present circuit eliminates the use of magnetically-coupled devices, such as transformers, for triggering the discharge operation. Constructing the crowbar circuit from solid-state devices saves weight, circuit board space, and improves reliability of operation.

It will be further appreciated that the disclosed crowbar circuit is highly flexible in that it may be used to discharge any range of voltages by appropriate selection of components and inclusion of the appropriate number of component stages in the circuit. Multiple voltage levels may also be simultaneously discharged by connecting the voltage level following the appropriate component stage. The disclosed circuit is therefore easily adapted to many different environments.

While the preferred embodiment of the invention has been illustrated and described, it will be appreciated that various changes can be made therein without departing from the spirit and scope of the invention. For example, as currently constructed, the voltage clamp operation is preferably handled by diodes DD. Those skilled in the art will recognize, however, that the disclosed crowbar circuit 100 can also provide over-voltage protection without the diodes by selection of durable transistors with ratings that allow the transistors to operate in avalanche and provide a conductive path between the high voltage source and the driver stage. This method of operation is not preferred, however, because operating the transistors in avalanche places unwanted stress on the components. Similarly, when discharging an undesirably high voltage to ground the circuit could also operate without diodes DD. In this embodiment, the transistors would operate in avalanche to allow the current to reach those stages that have entered conduction. As mentioned above, however, this mode of operation places unnecessary stress on the components. Therefore, diodes will typically be employed in the preferred embodiment of crowbar circuit 100. It is an object of the appended claims to cover all modifications and variations as come within the true spirit and scope of the invention.

The embodiments of the invention in which an exclusive property or privilege is claimed are defined as follows:

1. A solid-state crowbar circuit for shunting a high voltage to a predetermined potential much lower than the high voltage, comprising:

(a) a first component stage coupled to the high voltage and operable to conduct current flow in a conduction path from the high voltage when said first component stage is biased in an on state, said first component stage normally being biased in an off state so that the first component stage will not conduct current;

(b) a driver stage coupled to the first component stage and operable to regulate current along the conduction path when biased in an on state, said driver stage including a discharge impedance coupled to the predetermined potential, said driver stage normally being biased in an off state so that the driver stage will not regulate current; and (c) an enable source coupled to said driver stage for generating an enable signal, the enable signal biasing said driver stage in the on state and creating a regulated current through the discharge impedance to the predetermined potential, the regulated current further biasing said first component stage in an on state, thereby shunting the high voltage to the predetermined potential by discharge along the conduction path through the first component stage and the driver stage.

2. The solid-state crowbar circuit of claim 1, wherein the discharge impedance is a resistor.

3. The solid-state crowbar circuit of claim 1, wherein the driver stage comprises a MOSFET connected in series with the discharge impedance.

4. The solid-state crowbar circuit of claim 1, further comprising a bias circuit for providing a bias voltage level to the first component stage.

5. The solid-state crowbar circuit of claim 1, wherein the predetermined potential is ground.

6. The solid-state crowbar circuit of claim 1, wherein the driver stage is biased in the on state until the enable signal is removed, so that the conduction path is maintained until the enable signal is removed.

7. The solid-state crowbar circuit of claim 1, further comprising a plurality of additional component stages coupled in cascade to the first component stage, remote from the driver stage, each of said additional component stages being operable to conduct current along the conduction path when biased in an on state, wherein each of said component stages is normally biased in an off state so that each component stage will not conduct current, each of said component stages being automatically biased on after the component stage next closest to the driver stage is biased on.

8. The solid-state crowbar circuit of claim 7, wherein a second high voltage different from the first high voltage is coupled to a component stage at a point distinct from the first high voltage.

9. The solid-state crowbar circuit of claim 7, wherein each of the component stages comprises a MOSFET.

10. The solid-state crowbar circuit of claim 9, further comprising a bias circuit for providing a bias voltage to each of the component stages.

11. The solid-state crowbar circuit of claim 1, further comprising shunting means in parallel with the first component stage to shunt the high voltage to the driver stage when the high voltage exceeds a preselected value.

12. The solid-state crowbar circuit of claim 11, further comprising shunting means in parallel with the driver stage to shunt the high voltage to the predetermined potential when the high voltage exceeds a preselected value.

13. The solid-state crowbar circuit of claim 12, wherein the shunting means is a diode configured to conduct in avalanche when the high voltage exceeds the preselected value.

14. The solid-state crowbar circuit of claim 13, wherein the preselected value is selected to be less than a sum of a value at which the diode of each component stage will avalanche.

15. A solid-state crowbar circuit for shunting a high voltage to ground, comprising:

(a) a first transistor stage operable to regulate current when biased in an on state, said first transistor stage including a discharge resistor coupled to a ground potential, said first transistor stage normally being biased in an off state so that the first transistor stage will not regulate current;

(b) a second transistor stage coupled to the first transistor stage and also coupled to the high voltage, said second transistor stage being operable to conduct current when biased in an on state, said second transistor stage normally being biased in an off state so that the second transistor stage will not conduct current; and (c) an enable source coupled to said first transistor stage for generating an enable signal, the enable signal biasing said first transistor stage in the on state and creating a regulated current through the discharge resistor to ground, the regulated current further automatically biasing said second transistor stage in an on state, whereby the high voltage is shunted to ground by the creation of a conduction path from the high voltage, through the second transistor stage, the first transistor stage including the discharge resistor, and to ground.

16. The solid-state crowbar circuit of claim 15, wherein the first transistor stage comprises a MOSFET connected in series with the discharge resistor.

17. The solid-state crowbar circuit of claim 15, further comprising a bias circuit for providing a bias voltage level to the second transistor stage.

18. The solid-state crowbar circuit of claim 15, wherein the second transistor stage is biased in the on state until the enable signal is removed, so that the conduction path is maintained until the enable signal is removed.

19. The solid-state crowbar circuit of claim 15, further comprising a plurality of transistor stages coupled in cascade to the second transistor stage, remote from the first transistor stage, each of said plurality of transistor stages being operable to conduct current along the conduction path when biased in an on state, wherein each of said plurality of transistor stages is normally biased in an off state so that each transistor stage will not conduct current, each of said plurality of transistor stages being automatically biased on after the transistor stage next closest to the first transistor stage is biased on.

20. The solid-state crowbar circuit of claim 19, wherein a second high voltage different from the first high voltage is coupled to a transistor stage at a point distinct from the first high voltage.

21. The solid-state crowbar circuit of claim 19, wherein each of the transistor stages comprises a MOSFET.

22. The solid-state crowbar circuit of claim 21, further comprising a bias circuit for providing a bias voltage to each of the transistor stages.

23. The solid-state crowbar circuit of claim 15, further comprising shunting means in parallel with the second transistor stage to shunt the high voltage to the first transistor stage when the high voltage exceeds a preselected value.

24. The solid-state crowbar circuit of claim 23, further comprising additional shunting means in parallel with the first transistor stage to shunt the high voltage to ground when the high voltage exceeds a preselected value.

25. The solid-state crowbar circuit of claim 24, wherein the shunting means is a diode configured to conduct in avalanche when the high voltage exceeds the preselected value.

26. The solid-state crowbar circuit of claim 25, wherein the preselected value is selected to be less than a sum of a value at which each transistor stage will avalanche.

\* \* \* \* \*